Patented Dec. 30, 1947

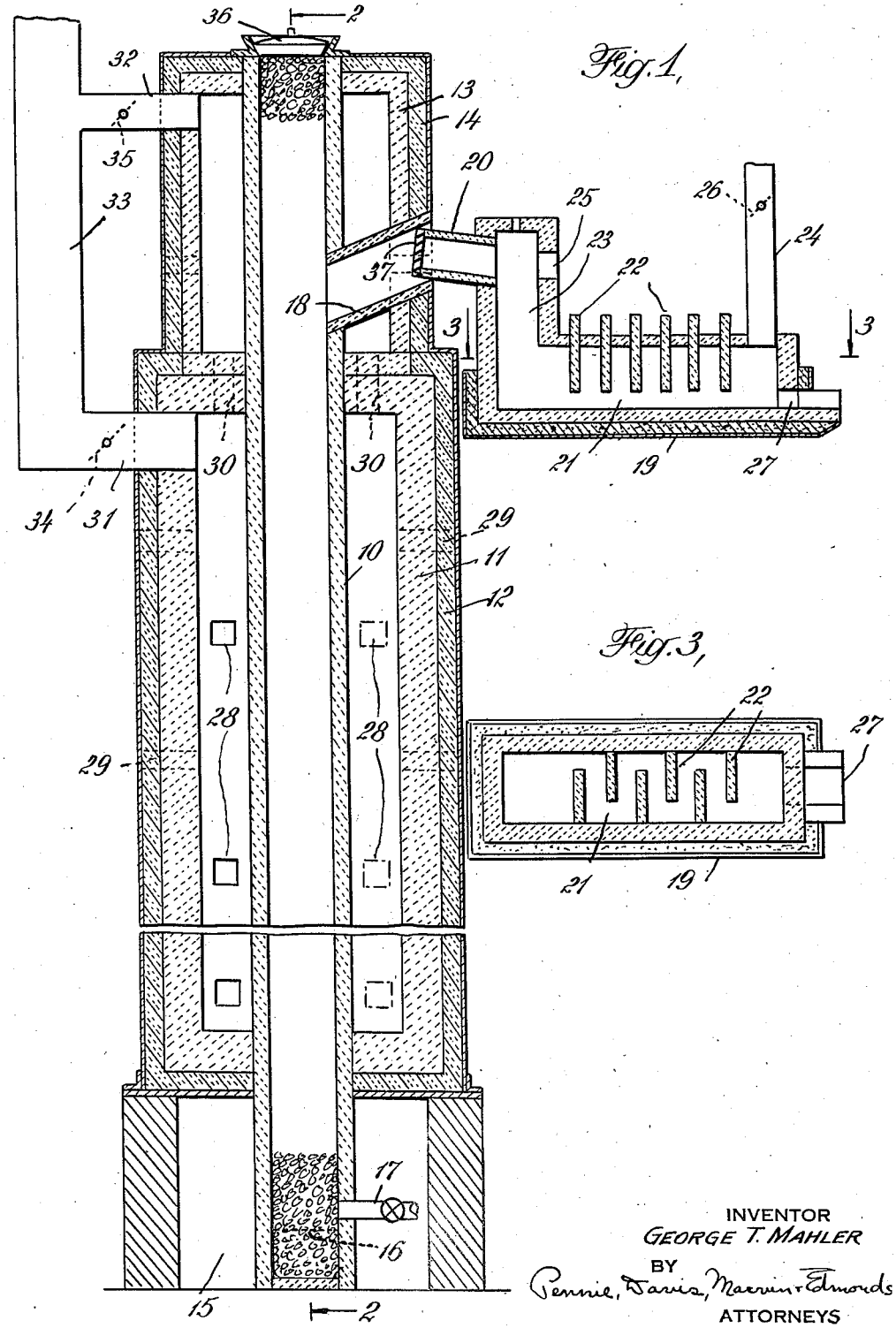

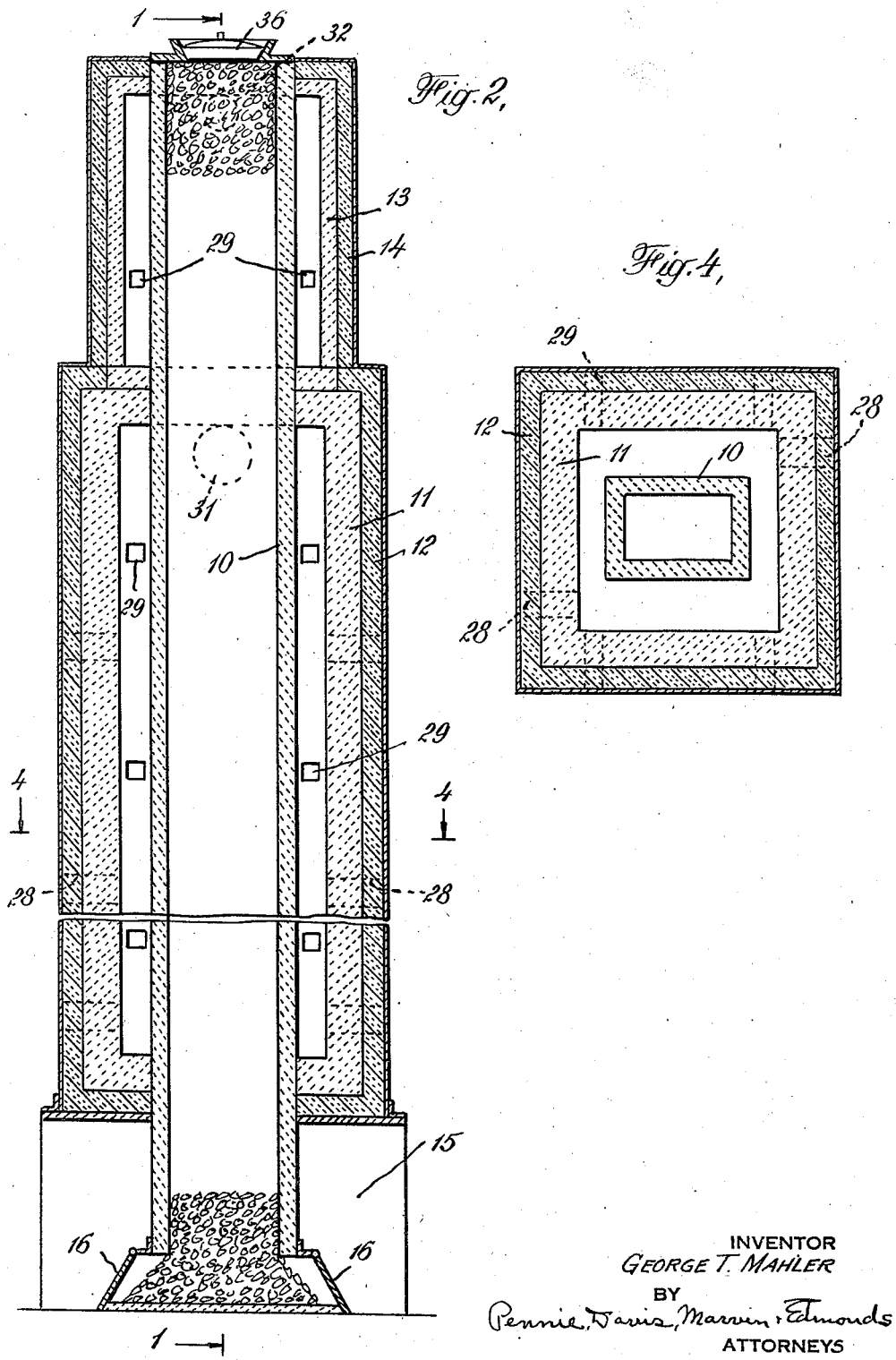

2,433,615

UNITED STATES PATENT OFFICE 2,433,615

TREATMENT OF DROSS FOR THE RECOVERY OF ZINC

George T. Mahler, Palmerton, Pa., assignor to The New Jersey Zinc Company, New York, N. Y., a corporation of New Jersey Application March 27, 1945, Serial No. 585,112

7 Claims. (Cl. 75—24)

This invention relates to the treatment of dross, and has for its object the provision of an improved method of treating dross.

Dross, within the meaning of this invention, is any material containing metallic zinc in economically recoverable amount and includes galvanizer's dross or hard zinc, metal turnings, scrap and the like of zinc base and other zinc-containing alloys, metallic residues of zinc refining operations, and the like. The invention contemplates an improved method of recovering or reclaiming metallic zinc of commercial purity from dross. Thus the invention involves introducing the dross at the top of a packed column externally heated to maintain a melting zone approximate the top of the column and a volatilizing zone immediately below the melting zone, and withdrawing zinc vapor from the column at a point approximate the junction of the melting and volatilizing zones. The column preferably includes briquets of carbonaceous material, such as coked fuel briquets, and may consist wholly of such briquets or of a mixture of such briquets and briquets of an inert material such as silicon carbide. Where carbonaceous briquets are included in the column, air may be admitted near the bottom of the column in amount sufficient to convert some part but not all of the carbon content of these briquets to carbon monoxide. The packed column may progressively descend by gravity through an externally heated vertical retort by withdrawing from the bottom and introducing at the top of the column substantially equivalent amounts of the packing composing the column.

The foregoing and other novel features of the invention will be better understood from the following description taken in conjunction with the accompanying drawings, in which, Fig. 1 is a sectional elevation of an apparatus particularly adapted for practicing the method of the invention, Fig. 2 is a sectional elevation taken on the section line 2—2 of Fig. 1, Fig. 3 is a sectional plan of the condenser taken on the section line 3—3 of Fig. 1, and Fig. 4 is a sectional plan of the externally heated retort furnace taken on the section line 4—4 of Fig. 2.

The apparatus illustrated in the drawings comprises a rectangular vertical retort 10 suitably mounted within and spaced from a main furnace structure consisting generally of an interior wall 11 of heat-resistant material, such as fire brick, and an outer wall 12 of heat-insulating material, such as insulating brick. The retort 10 may advantageously be built up of silicon carbide brick or equivalent heat and zinc vapor resistant material, and extends upwardly beyond the furnace structure 11—12 through and suitably spaced from an auxiliary furnace structure consisting generally of an interior wall 13 of heat-resistant brick or the like and an exterior wall 14 of heat-insulating brick or the like. Below the furnace structure 11—12, the retort 10 extends into a discharge pit 15, and is provided at its lower end with discharge doors 16. A valved pipe 17 permits the introduction of air into the lower end of the retort 10, somewhat above the discharge doors 16 but below the furnace structure 11—12.

Just above the main furnace structure 11—12, but well below the top of the retort 10, a zinc vapor outlet pipe 18 communicates with the retort. The outer or discharge end of the pipe 18 is connected to a condenser 19 through a pipe 20. The condenser is generally of the type described in the United States patent of E. H. Bunce, No. 1,873,861, and comprises an elongated condensing chamber 21 of rectangular section built up of silicon carbide brick or the like. Spaced baffles 22 depend from the top or roof of the condensing chamber to within a short distance of the bottom and extend alternately from opposite sides of the chamber to within a short distance of the other side. The condensing chamber 21 has an upright vapor inlet flue 23 at one end communicating with the pipe 20, and a stack 24 at the other end for exhaust gases. The flue 23 has a normally closed clean out opening 25, and the stack 24 has a damper 26 for controlling the flow therethrough of the exhaust gases. The condensing chamber has a tap hole 27 for molten metal, at the same end as the stack 24.

Ports 28 for fuel burners extend through the opposite end walls of the main furnace structure. Three such ports are provided in each end wall and are so positioned that the gaseous products of combustion from the burners are directed in opposite directions against the opposite side walls of the retort (Fig. 4). Suitable holes 29 extend through the opposite side walls of the main and auxiliary furnace structures for the accommodation of thermocouples or the like. Vertical ports or nostrils 30 connect the heating chambers of the main and auxiliary furnace structures. The heating chambers of the main and auxiliary furnace structures have exhaust gas flues 31 and 32, respectively, communicating with a common stack 33, and provided with dampers 34 and 35, respectively. The top of the retort 10 is normally closed by a removable cover 36.

In practicing the invention in the apparatus illustrated in the drawings, the retort 10 is initially filled with appropriate packing to provide a packed column. The packed column may be made up of briquets, or equivalent solid shapes, to impart the porosity customary in such columns. The column may, for example, be composed solely of briquets or agglomerates of carbonaceous material, such for example as the coked fuel agglomerates produced by the method of United States patent of E. H. Bunce No. 1,941,462, or of a mixture of such briquets and briquets of silicon carbide or similar inert material, or solely of briquets of silicon carbide or similar inert material. The briquets or agglomerates may be of any convenient size and shape, the conventional pillow block briquet being well suited for the purpose. In the interest of simplicity, I have throughout this specification and the appended claims spoken of briquets in a generic sense to include all solid shapes, however formed, of suitable size and shape to provide the contemplated packed column.

The packed column within the retort 10 is heated (by the burners in the ports 28) until that part of the column below the zinc vapor outlet 18 is at a temperature sufficiently high to volatilize molten zinc, and that part of the column above the outlet 18 is at a temperature sufficiently high to melt zinc without volatilization. Dross to be treated is then introduced on top of the column, and the zinc and other metals in the dross melt and flow or trickle by gravity through the column until they reach that part below the outlet 18, where zinc is volatilized, and the resulting zinc vapor flows through the outlet 18 into the condenser 19 where it is condensed. Thus, there is maintained in the externally heated packed column, a top melting zone and immediately thereneath a volatilzing zone, with the outlet for the resulting zinc vapor at approximately the junction of the two zones. The top melting zone of the column is heated by the gaseous products of combustion passing through the ports 30 into the heating chamber of the auxiliary furnace structure. Appropriate regulation of the dampers 34 and 35 controls the amount of heating gases flowing through the ports 30 to maintain the contemplated temperature differential between the melting and volatilizing zones. Thermocouples or other types of pyrometers, suitably positioned in the holes 29, serve to accurately indicate the thermal condition within the heating chambers and hence of the exterior of the retort 10 throughout its length. In an apparatus of the construction shown in the drawings, where the vertical retort 10 is approximately 1 foot by 2 feet in cross section, and the melting zone of the packed column is 3 to 5 feet in length, the exterior of the retort within the auxiliary furnace structure may be heated to about 1000° C. and the exterior of the retort within the main furnace structure may be heated to about 1200–1300° C., to provide and maintain the melting and volatilizing zones of the invention. The interior of the retort and packed column do not, of course, attain these temperatures, because of the absorption of heat by the melting of zinc in the melting zone, and by the volatilization of molten zinc in the volatilizing zone.

When normal operating conditions are established, the packed column will be externally heated as hereinbefore explained, and the column will be caused to progressively descend through the retort by withdrawing a suitable amount of the packing material through the discharge doors 16 and introducing an equivalent amount of packing material (including dross to be treated) at the top of the column, the cover 36 being removed temporarily for this purpose. In the apparatus of the drawing, the packing is manually withdrawn from the bottom of the column, but it will be understood that the bottom of the retort may be equipped with a suitable mechanical discharge. All or any desired part of the packing withdrawn from the bottom may be recharged at the top. The dross may be mixed with the packing introduced at the top of the column, or may be separately introduced. Charges of dross may conveniently be made every 30 or 40 minutes, and the heating of the melting zone of the column is so regulated that substantially all of the zinc and other metals in the dross are melted during this period. As the zinc and other metals in the dross melt in the melting zone, they flow into the volatilizing zone and zinc is volatilized.

One common source of dross is the so-called "hard zinc" from galvanizing operations. When the molten galvanizing bath is sufficiently spent or exhausted, the hard zinc accumulating at the bottom is solidified, usually in a large lump, and is marketed as such. Hard zinc commonly contains bolts, hooks and similar articles subjected to galvanizing and which become loose and hence lost in the bath. These articles are included in the solidified hard zinc, and are frequently used for handling it. For the practice of the invention, the lumps of hard zinc are broken up into pieces of convenient size for charging into the vertical retort, alone or mixed with fresh packing.

The metallic content of the dross, other than zinc, and of higher boiling temperature than zinc, as for example iron, copper, lead, tin, etc., remains with the packing and is discharged from the base of the retort, along with the withdrawn packing, in the form of a granular metallic residue. Galvanizer's dross customarily contains iron, as well as a heterogeneous mixture of metallic objects such as bolts, hooks and the like. The metallic residue from such iron-containing dross can be readily recovered from the withdrawn packing by magnetic separation. When the dross includes zinc alloys, the alloying metals, such as copper, lead, tin, etc., largely accompany the iron in the metallic residue, and may be selectively recovered from the concentrate of the magnetic separation.

The bottom of the retort 10 is not ordinarily sealed, but merely closed by the doors 16, thus permitting a substantial amount of air to enter. If the doors 16 are sealed, it is advantageous to introduce a controlled amount of air into the bottom of the retort through the pipe 17. When air is thus admitted or introduced into the bottom of the retort, the packed column should include sufficient carbon, e. g., coked fuel briquets, to convert all of the oxygen of the air to carbon monoxide, and preferably the amount of carbon in the column should be considerably in excess of that required to convert all of the oxygen in the entering air to carbon monoxide. The carbon monoxide thus formed together with the nitrogen in the air produce a desirable updraft through the packed column. When the retort is operated without sealing the doors, the only air introduced is that caused to flow by the stack draft. Under these conditions it is not necessary to introduce air through the pipe 17. The air, from whatever source, entering the bottom of the retort causes carbon monoxide and nitrogen dilution of the rich zinc vapor, which may be desirable when producing zinc dust or zinc oxide from the zinc vapor, but is undesirable when condensing the zinc vapor to zinc metal. The up-draft of carbon monoxide and nitrogen does, in any case, prevent the zinc vapor from backing down and condensing on the colder packing or causing bottom fuming.

The presence of carbonaceous briquets in the charge establishes reducing conditions in both the melting and volatilizing zones, so that the formation of skimmings or oxide crusts by oxidation during the melting is minimized, and whatever skimmings may be formed in the melting zone are reduced in the volatilizing zone.

In the apparatus of the drawing, the zinc vapor outlet pipe 18 is inclined upwardly at a sufficient angle to insure downward progress of the packing without objectionably obstructing the pipe. The entrance end of the communicating pipe 20 may be provided with a baffle 37 of the louver type to prevent any of the packing entering the condenser. Any appropriate arrangement of baffles can, of course, be used for this purpose. The zinc vapor is condensed in the chamber 21 of the condenser, and the resulting molten zinc is removed from time to time through the tap hole 27. The zinc metal thus recovered from the dross is usually of intermediate grade, and may be refined in a rectifying column or columns to obtain zinc metal of high purity. The zinc vapor from the outlet 18 may be directly (i. e., without condensation) transformed to high purity metal by rectification. Or, the zinc vapor from the outlet 18 may be condensed to zinc dust, or it may be burned to zinc oxide.

Zinc purified from contaminants with boiling points exceeding that of zinc (such as lead) may be obtained by maintaining a section or zone of the retort and packed column immediately below the zinc vapor outlet 18 at such a temperature that zinc vapor is partially condensed therein but which does not cause the down-flowing molten dross to freeze. The temperature of this zone of the packed column will be intermediate the temperatures of the melting and volatilizing zones and may be maintained in any suitable manner.

Except for the relatively small amount of carbon that is oxidized to carbon monoxide by air entering or introduced into the bottom of the retort, the packing composing the column is inert. The packing serves to support the dross until it is melted, and to distribute the molten zinc in relatively thin films over the surfaces of the solid shapes of the packing, thereby promoting volatilization. Moreover, the voids of the packed column provide channels for the ready escape of zinc vapor to the outlet therefor and also for the gaseous up-draft when air is admitted at the base of the column. The packing also serves to conduct heat from the heated wall of the retort to the interior thereof, and silicon carbide and carbonaceous material are particularly well adapted for this purpose. As hereinbefore mentioned, withdrawn packing may be recharged, generally after any recoverable metallic residue in the withdrawn packing has been separated therefrom.

I claim:

1. The method of recovering zinc from dross which comprises introducing the dross at the top of a packed column, externally heating said column to maintain (1) a melting zone near its top at a temperature sufficiently high to melt the zinc and other metals in the dross but insufficient to volatilize zinc and (2) a volatilizing zone immediately below the melting zone into which the melted dross flows by gravity from the melting zone and zinc is volatilized, and withdrawing zinc vapor from the column at a point approximate the junction of said zones.

2. The method of claim 1 in which the packed column includes briquets of carbonaceous material.

3. The method of claim 1 in which the packed column includes briquets of carbonaceous material and air is admitted near the bottom of the column in amount sufficient to convert some part but not all of the carbon content of said briquets to carbon monoxide.

4. The method of claim 1 in which the packed column progressively descends by gravity through an externally heated vertical retort by withdrawing from the bottom and introducing at the top of the column substantially equivalent amounts of the packing composing the column.

5. The method of claim 1 in which the column is composed of a mixture of coked fuel briquets and silicon carbide briquets and progressively descends by gravity through an externally heated vertical retort by withdrawing from the bottom and introducing at the top of the column substantially equivalent amounts of the packing composing the column.

6. The method of recovering zinc from dross which comprises introducing the dross in solid form at the top of a packed column including briquets of carbonaceous material and which progressively descends by gravity through an externally heated vertical retort by withdrawing from the bottom and introducing at the top of the column substantially equivalent amounts of the packing composing the column, said retort being heated to maintain (1) a melting zone approximate the top of the column and (2) a volatilizing zone immediately below the melting zone into which molten zinc flows by gravity from the melting zone and is volatilized, admitting air near the bottom of said column in amount sufficient to convert some part but not all of the carbon content of said briquets to carbon monoxide, and withdrawing zinc vapor from the column at a point approximate the junction of said zones.

7. The method of treating dross containing zinc and iron which comprises introducing the dross in solid form at the top of a packed column including briquets of carbonaceous material and which progressively descends by gravity through an externally heated vertical retort by withdrawing from the bottom and introducing at the top of the column substantially equivalent amounts of the packing composing the column, said retort being heated to maintain (1) a melting zone approximate the top of the column and (2) a volatilizing zone immediately below the melting zone into which molten zinc flows by gravity from the melting zone and is volatilized, admitting air near the bottom of said column in amount sufficient to convert some part but not all of the carbon content of said briquets to carbon monoxide, withdrawing zinc vapor from the column at a point approximate the junction of said zones, and recovering by magnetic separation the residual metallic content of the packing withdrawn from the bottom of the column.

GEORGE T. MAHLER.

REFERENCES CITED

The following references are of record in the file of this patent:

UNITED STATES PATENTS

| Number | Name | Date |
| --- | --- | --- |
| 1,526,910 | Job | Feb. 17, 1925 |
| 1,749,127 | Bunce et al. | Mar. 4, 1930 |
| 1,754,845 | Baily et al. | Apr. 15, 1930 |
| 2,215,961 | Hawk | Sept. 24, 1940 |
| 1,994,356 | Pierce et al. | Mar. 12, 1935 |